Figure 4:
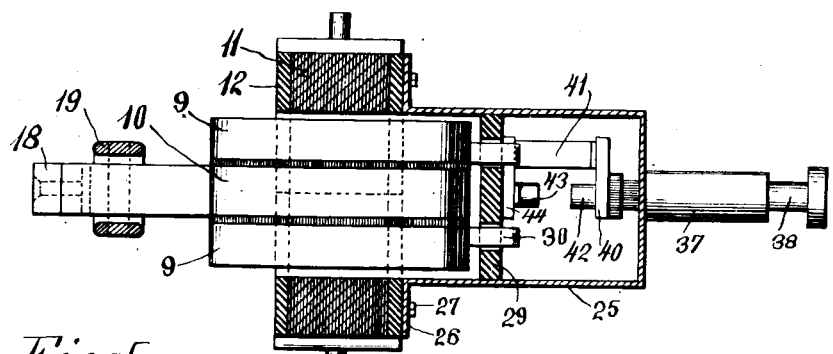

J. H. GRAVELL.
WELDING MACHINE.
APPLICATION FILED MAY 17, 1913.
1,086,042.
Patented Feb. 3, 1914.
2 SHEETS—SHEET 1.
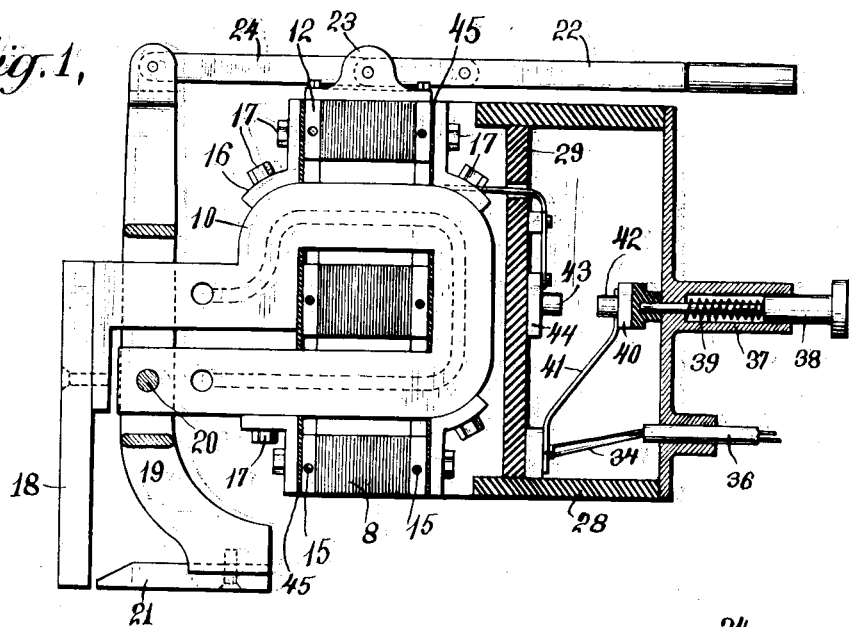

J. H. GRAVELL.
WELDING MACHINE.
APPLICATION FILED MAY 17, 1913.

1,086,042.

Patented Feb. 3, 1914.

2 SHEETS—SHEET 2.

WITNESSES

INVENTOR

ATTORNEY

UNITED STATES PATENT OFFICE.

JAMES H. GRAVELL, OF PHILADELPHIA, PENNSYLVANIA, ASSIGNOR TO HALE AND KILBURN COMPANY, OF PHILADELPHIA, PENNSYLVANIA, A CORPORATION OF DELAWARE.

WELDING-MACHINE.

1,086,042.

Specification of Letters Patent. Patented Feb. 3, 1914.

Application filed May 17, 1913. Serial No. 768,208.

*To all whom it may concern:*

Be it known that I, JAMES H. GRAVELL, a citizen of the United States, residing at Philadelphia, in the county of Philadelphia and State of Pennsylvania, have invented certain new and useful Improvements in Welding-Machines, of which the following is a specification.

This invention relates to welding machines and is directed particularly to the provision of an electric welding machine which is of very small size compared to its capacity.

The primary object of the invention is to produce a machine of such small size as to make is portable so that it can be used by manipulating the machine with respect to the work rather than by manipulating the parts to be welded with respect to the machine.

To this end the invention involves a novel construction and arrangement of the parts of an electric welding machine whereby the size of the machine is reduced without reducing its capacity and whereby the parts of the machine may be combined in a structure which possesses great strength, which may be manufactured at relatively small cost and which may be readily manipulated in performing welding operations.

A welding machine constructed in accordance with the invention embodies an electric transformer, terminals connected to the secondary of the transformer and movable relatively to cause them to grip and make electrical connection to the work, suitable operating mechanism for moving the terminals readily and for manipulating the machine and a switch for closing the primary circuit.

In accordance with the invention, the secondary coil of the transformer consists of a conductor of relatively large cross-section so that it possesses considerable rigidity and this secondary coil is secured rigidly to the core of the transformer. These two parts are thus rigidly united and the various parts employed in connection therewith may be mounted upon one or the other of these two parts. This conduces to the production of a machine which is very strong and compact. The two terminals of the machine are attached directly to the ends of the secondary coil, which latter preferably consists of a single turn of a copper bar of large cross section. One of these terminals may be rigidly attached directly to one end of the secondary whereas the other is pivotally mounted upon the other end of the secondary. In order to conveniently mount the terminals in this way, keeping them electrically separated and providing for movement of one of them about a pivot to carry its end into coaction with the other terminal, the movable terminal is preferably arranged so as to straddle the connection to the stationary terminal.

The core of the transformer of my improved machine is also constructed in a novel manner which facilitates the assemblage of the parts and aids in giving the completed structure great strength and rigidity. The core is formed in two or more parts so shaped that when assembled they will properly inclose the primary and secondary coils. These parts of the core are laminated as is usual in such cores. The laminæ for a part of the core are assembled and on either side thereof is placed a metallic plate of substantially the same shape as the laminæ, but of considerably greater thickness. These plates and the laminæ between them are secured together rigidly in the usual manner. When the parts of the core are assembled with the coils between them, these parts are secured together by means of locking bolts which pass through openings provided therefor in the plates. When the parts of the core are united in this way and the secondary coil is secured to the core as above set forth, these two parts form a rigid frame upon which all of the other parts of the machine may be assembled.

These and other novel features of the invention will be more readily understood by reference to the drawings annexed hereto which show the preferred embodiment of the invention and in which—

Figure 5:
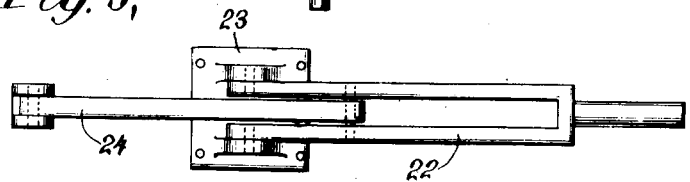
Figure 6:
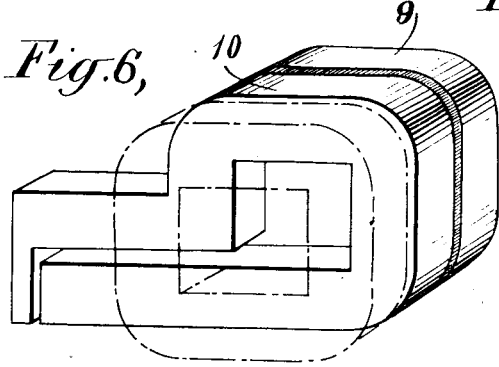
Figure 7:
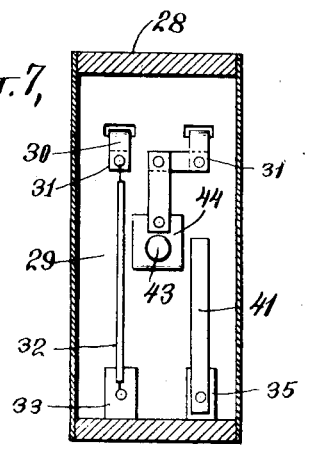

Figure 1 is a vertical sectional view of the machine partly in elevation, Fig. 2 is a perspective view of the core, Fig. 3 is an end view of the terminals, Fig. 4 is a horizontal sectional view of the machine, Fig. 5 is a top view of the movable terminal and the operating mechanism therefor, Fig. 6 is a perspective view of the coils and Fig. 7 is a sectional view through the switch box.

Referring to these drawings, 8 indicates the core of the machine, 9 the two primary coils and 10 the secondary coil which is located between the two primary coils. The construction of the core is shown in Figs. 1, 2 and 4. By reference to these figures, it will be seen that the core is formed in two parts, the division between the two being in a vertical plane. These two parts are of such shape that when placed together they form two hollow rectangles, the two openings through the core structure being for the reception of the coils. Each part of the core consists of a bundle of laminæ 11 and on either side of these laminæ plates 12 of considerably greater thickness than the laminæ 11. The plates 12 are of the same shape as the laminæ 11 and when placed on either side thereof are secured together so as to hold the laminæ rigidly between them. When the primary and secondary coils 9 and 10 have been assembled upon the central portion 13 of the two parts of the core 8, the ends of these two parts are brought together so that they inclose the coils and the two parts are then secured together. For this purpose each of the plates 12 is provided with a plurality of openings extending therethrough in the direction of the planes of the plates. These openings are shown at 14 in Fig. 2. Bolts 15 are passed through the openings 14 in coacting plates 12 and nuts are screwed up on the ends of these bolts to draw the parts of the core tightly together and hold them rigidly.

The secondary coil 10 consists of a single turn of a copper bar preferably of the shape shown in Fig. 1. This secondary coil is rigidly secured to the core 8. For this purpose a plurality of brackets 16 are employed. Each of these brackets is secured at one end to the core 8 and at the other end to the coil 10 by means of bolts 17. The secondary coil and the core are thus rigidly united and the primary coils are held in position in the spaces between the secondary coil and the core.

The terminals are shown at 18 and 19. The terminal 18 is rigidly secured to one end of the secondary coil 10 and extends downwardly therefrom. The two ends of the secondary are preferably in line vertically and the movable terminal must be connected to one of these ends so as to be movable thereon, but must be spaced from the other end. For this purpose the movable terminal 19 is preferably so made that it will straddle the end of the secondary coil upon which the terminal 18 is mounted. The construction of this terminal 19 is best shown in Fig. 3. As there shown, a portion of the terminal 19 has the form of a hollow rectangle, the sides of which lie on opposite sides of the end of the secondary coil to which the terminal 18 is secured. These sides of the terminal 19 are connected to the other end of the secondary coil by means of a heavy copper pivot pin 20. The lower end of the terminal 19 is arranged to receive a suitable welding tool 21. The terminal 19 is moved by means of an operating lever 22 which is pivotally mounted between the brackets 23 which are mounted upon the core of the transformer. A link 24 is pivotally connected at one end to the upper end of the terminal 19 and at its other end to the lever 22 at a point eccentric to the pivot of that lever. The link 24 and lever 22 constitute a toggle by means of which the terminal 19 may be operated so as to cause the tool 21 thereon to engage the parts to be welded with substantial pressure.

A switch is provided for closing and opening the primary circuit. In the present instance, this switch is shown as mounted within a switch-box which is rigidly secured to the core of the machine. This box is shown at 25 and consists preferably of a piece of sheet-metal bent to the cross-sectional shape shown in Fig. 4 and having the flanges 26 at its edges secured to the plates 12 on one side of the core 8 by suitable bolts 27. The ends of the switch-box are closed by plates 28, preferably of some insulating material such as fiber. Within the switch-box is mounted a wall or plate 29 having openings therein through which the ends of the primary coil pass as shown at 30 in Figs. 4 and 7. These ends of the primary coil are connected to metallic studs or blocks 31 mounted upon the plate 29. One of these blocks is connected by a wire 32 with a block 33 and the two wires 34 supplying current to the machine are connected one to this block 33 and the other to a corresponding block 35. These two wires 34 enter the switch-box through a bushed opening 36 in the switch-box.

A manually operated switch is provided for effecting electrical connection between the block 35 and the opposite block 31. In the wall of the switch-box is a tubular member 37 having a plunger 38 movable therein, the outer end of which is shaped to form a handle. A spring 39 within the tubular member 37 normally holds the handle 38 in its outermost position. The inner end of the handle 38 is connected to a metallic block 40 and the latter has one end of a flexible conductor 41 connected thereto whose opposite end is connected to the metallic block 35 mounted on plate 29. The block 40 has a contact 42 mounted thereon which is adapted to engage an underlying contact 43 mounted on a conducting strip 44 which is secured upon the plate 29 and electrically connected to one of the terminals 31 of the primary coils. These parts are shown in Figs. 1 and 4 and diagrammatically in Fig. 7. By pressing the handle 38 against the tension of spring 39, the contacts 42 and 43 are caused to engage thereby closing the circuit of the primary coils.

In securing the secondary coil and the core together, insulating material is inserted between these parts. In the present instance, strips of insulating material are shown at 45 interposed between the brackets 17 and the core 8. By this construction it will be seen that the core and secondary coil are secured together in such manner as to form a rigid structure which may be employed as the frame of the machine on which to mount the other parts of the machine. With these two parts as a frame, the terminals may be mounted upon the secondary in electrical connection therewith and the operating mechanism may be mounted upon the core in such position as to permit of manipulating the machine conveniently. In the present instance, it will be seen that the movable terminal is operated by a handle mounted upon the core and extending in proximity to the handle of the switch. This latter handle includes a stationary cylindrical portion and a movable contact-controlling button in the end thereof. With this construction, the operator may grasp the tubular member 37 with one hand and the end of lever 22 with the other so as to manipulate the machine as may be necessary and when the parts have been properly positioned he may operate the switch with the thumb of the hand which grasps the member 37. In this way the primary circuit may be closed so as to cause the welding current to flow in the secondary, the terminals affixed thereto and the work.

Having described my invention, what I claim as new therein and desire to secure by Letters Patent of the United States is:

1. A welding machine comprising the combination of a core consisting of laminæ secured together, a rigid secondary coil, a plurality of brackets bolted to the core and coil and uniting the same to form a rigid structure, a primary coil combined with said structure, terminals connected to the ends of the secondary coil, and means for moving said terminals relatively, substantially as set forth.

2. A welding machine comprising the combination of a core consisting of laminæ secured together, a rigid secondary coil, a plurality of brackets bolted to the core and coil and uniting the same to form a rigid structure, a primary coil combined with said structure, a terminal rigidly connected to one end of the secondary coil and otherwise disconnected from the machine, a second terminal pivoted to the other end of the secondary coil, and means for turning the second terminal about its pivot, substantially as set forth.

3. In a welding machine, a core comprising two bundles of laminæ, plates on opposite sides of each bundle of laminæ, securing means for securing said parts together which means extends through said plates parallel to the plane of the core, primary and secondary coils inclosed by the core, terminals connected to the ends of the secondary coils and means for moving said terminals toward and away from each other, substantially as set forth.

4. In a welding machine, a core comprising two bundles of laminæ, plates on opposite sides of each bundle of laminæ, bolts passing through said plates parallel to the planes of the plates for securing said parts together, primary and secondary coils inclosed by the core, terminals connected to the ends of the secondary coil and means for moving said terminals toward and away from each other, substantially as set forth.

5. In a welding machine, the combination of two bundles of laminæ, plates located on opposite sides of each bundle of laminæ and secured thereto, primary and secondary coils, means for securing said bundles of laminæ and said plates together inclosing said coils comprising securing devices passing through said plates parallel to the planes of the plates, terminals connected to the ends of the secondary coil and means for moving said terminals toward and away from each other, substantially as set forth.

6. In a welding machine, a two-part core each part of which consists of a plurality of laminæ and plates located on opposite sides of and secured to the laminæ, primary and secondary coils, bolts securing the two parts of the core together inclosing the coils, said bolts passing through the plates parallel to the plane of the core, terminals connected to the ends of the secondary coil and means for moving the terminals toward and away from each other, substantially as set forth.

7. In a welding machine, a two-part core each part of which consists of a plurality of laminæ and plates located on opposite sides of and secured to the laminæ, primary and secondary coils, securing devices for holding the two parts of the core together inclosing the coils which devices pass through said plates parallel to the plane of the core, means for securing the secondary coil and the core rigidly together, terminals connected to the ends of the secondary coil and means for moving the terminals toward and away from each other, substantially as set forth.

8. In a welding machine, a two-part core each part of which consists of a plurality of laminæ and plates located on opposite sides of and secured to the laminæ, primary and secondary coils, means securing the two parts of the core together inclosing the coils, a switch-box mounted on the core, switching mechanism in said box in the circuit of the primary coil, terminals connected to the ends of the secondary coil and means for moving the terminals toward and away from each other, substantially as set forth.

9. In a welding machine, a two-part core each part of which consists of a plurality of laminæ and plates located on opposite sides of and secured to the laminæ, primary and secondary coils, means securing the two parts of the core together inclosing the coils, means securing the core and secondary coil rigidly together, a switch-box mounted on the core, switching mechanism in said box in the circuit of the primary coil, terminals connected to the ends of the secondary coil and means for moving the terminals toward and away from each other, substantially as set forth.

10. In a welding machine, a core, primary and secondary coils thereon, means securing the secondary coil rigidly to the core, a switch-box mounted on the core, switching mechanism in said box connected in the circuit of the primary coil, terminals connected to the ends of the secondary coil and means for moving the terminals toward and away from each other, substantially as set forth.

11. In a welding machine, the combination of a core, primary and secondary coils thereon, a switch-box mounted on the core and having openings therein through which the ends of the primary coil extend, switching mechanism in said box connected to the ends of the primary coil, terminals connected to the ends of the secondary coil and means for moving the terminals toward and away from each other, substantially as set forth.

12. A welding machine comprising the combination of a core, primary and secondary coils through which the core extends, means for securing the secondary coil and core rigidly together, relatively movable terminals mounted on the combined core and secondary, a switch-box also mounted thereon and having openings through which the ends of the primary coil extend, switching mechanism in said box connected to the primary coil, terminals connected to the ends of the secondary coil and means for moving the terminals toward and away from each other, substantially as set forth.

This specification signed and witnessed this 14th day of May, 1913.

JAMES H. GRAVELL.

Witnesses:
JOHN B. KILBURN,
WM. J. EARNSHAW.

---

Correction in Letters Patent No. 1,086,042.

It is hereby certified that in Letters Patent No. 1,086,042, granted February 3, 1914, upon the application of James H. Gravell, of Philadelphia, Pennsylvania, for an improvement in "Welding-Machines," an error appears in the printed specification requiring correction as follows: Page 3, line 70, for the word "coils" read *coil*; and that the said Letters Patent should be read with this correction therein that the same may conform to the record of the case in the Patent Office.

Signed and sealed this 17th day of February, A. D., 1914.

[SEAL.]

J. T. NEWTON,
*Acting Commissioner of Patents.*